Jan. 28, 1936.  A. E. JESSER  2,029,173
SEALING RING
Filed Feb. 2, 1933  2 Sheets-Sheet 1
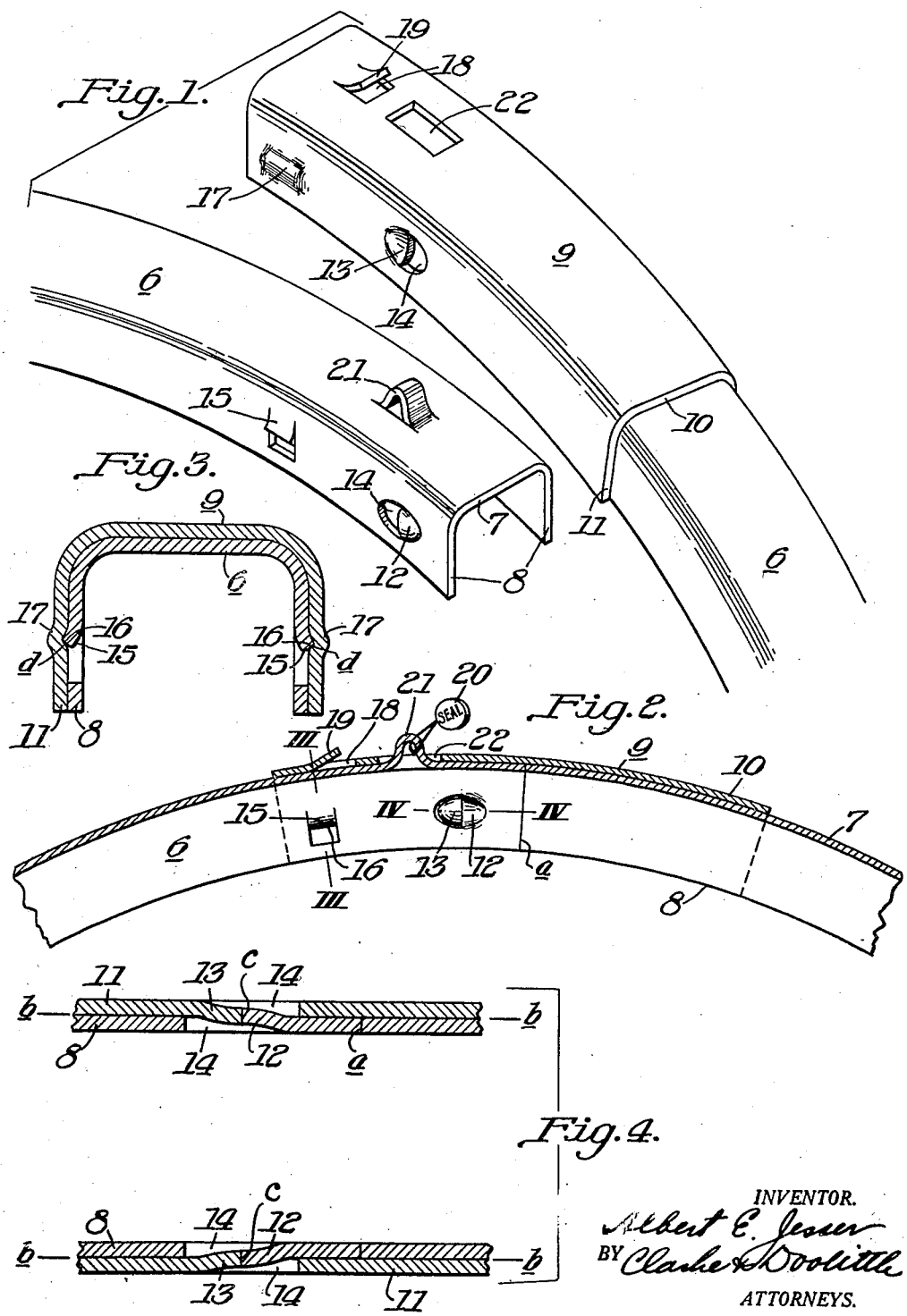
INVENTOR.
Albert E. Jesser
BY Clarke & Doolittle
ATTORNEYS.

Jan. 28, 1936.  A. E. JESSER  2,029,173
SEALING RING
Filed Feb. 2, 1933  2 Sheets-Sheet 2
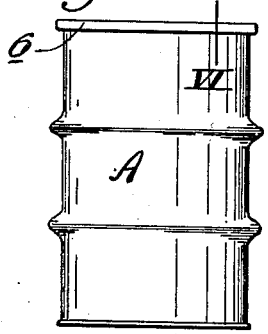
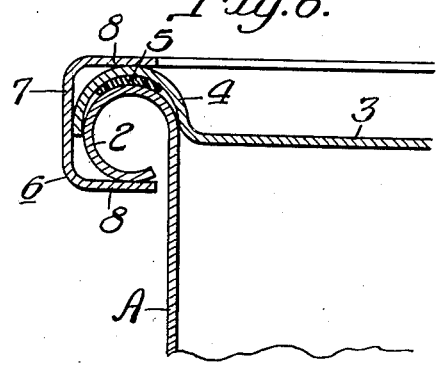
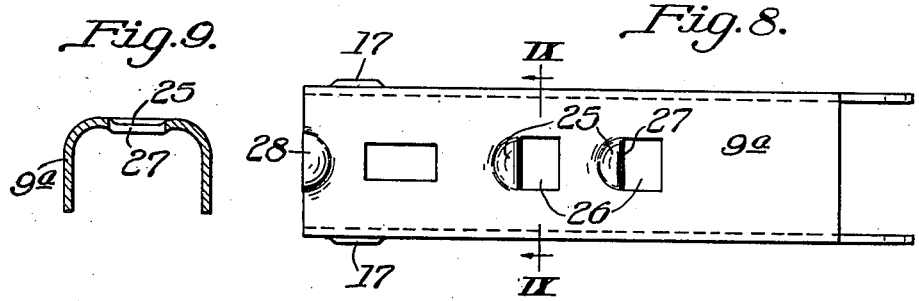
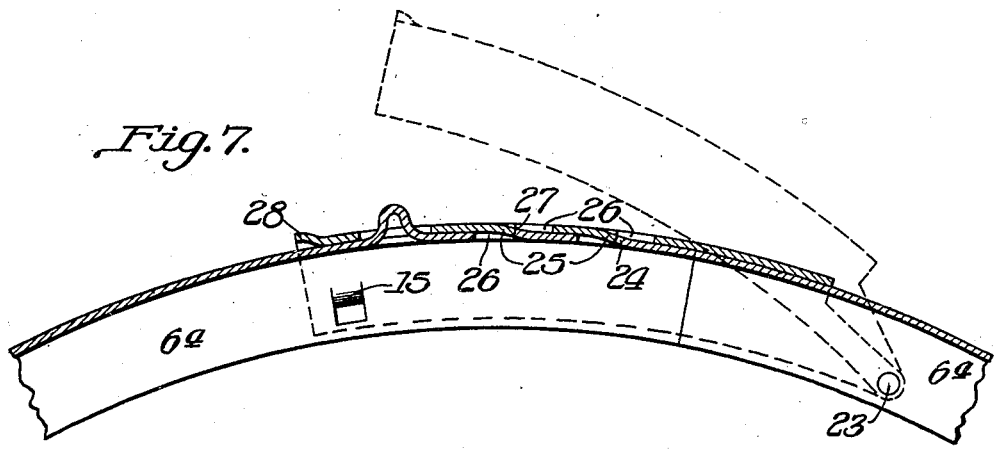
INVENTOR.
Albert E. Jesser
BY Clarke & Doolittle
ATTORNEYS.

Patented Jan. 28, 1936

2,029,173

UNITED STATES PATENT OFFICE 2,029,173

SEALING RING

Albert E. Jesser, Edgewood, Pa., assignor to Pittsburgh Steel Drum Company, Pittsburgh, Pa., a corporation of Pennsylvania Application February 2, 1933, Serial No. 654,833

9 Claims. (Cl. 220—61)

This invention relates to improvements in sealing rings or members of the character employed for removably securing the heads or covers to containers and the like.

In practice, greases, oils, paints and other substances are generally stored and/or transported in metal containers, as, for example, drums or barrels, formed with a rolled top or open end. Suitable metal heads or covers are employed in engagement with the said rolled tops of such containers, said heads being secured thereto by means of an embracing annular member or ring.

Such members are generally of the split ring type and include either permanent or detachable means at the free ends thereof for securing said ends together on the container. Various means have heretofore been employed for such purpose, but in most instances they are destroyed upon removal of the ring, and do not permit of repeated use.

It is a prime object of my invention to provide a snap-on sealing ring for the purpose specified which is of resilient construction, and includes cooperating means on the free ends thereof for interfitting and interlocking engagement to prevent disengagement of said ring by stresses either radially or circumferentially of the container.

It is a further object to provide in such a construction, snap-on means adapted to readily interfit and interlock and of substantial design, possessing a high degree of durability which renders said means fit for repeated and continued use without accidental disengagement or breakage.

Additional objects and advantages will become apparent from the following description taken in connection with the accompanying drawings, wherein:

Fig. 1 is a perspective collective view of the free ends of a snap-on sealing ring constructed in accordance with my invention;

Fig. 2, a longitudinal section of the ring of Fig. 1, showing the ends thereof in engagement;

Fig. 3, an enlarged cross-section taken on the line III—III of Fig. 2;

Fig. 4, an enlarged longitudinal section taken on the line IV—IV of Fig. 2;

Fig. 5, an elevational view of a container or drum to which my invention is applied;

Fig. 6, an enlarged cross-section taken on the line VI—VI of Fig. 5, particularly showing the manner in which the ring secures the head on the container;

Fig. 7, a view similar to Fig. 2, showing a modified form of my invention;

Fig. 8, an elevational view of the hinged latch member of Fig. 7; and

Fig. 9, a cross-section taken on the line IX—IX of Fig. 8.

Referring to the drawings, A designates a container known in the art as a steel drum, formed at its open end or top with a circumferential rolled portion or bead 2. A metal head or cover 3 is provided for closing the drum, said head being removable and having an annular grooved or channelled rim 4 for engaging the rolled portion or bead 2. 5 designates a ring gasket of suitable material which is positioned between said bead 2 and the rim 4.

Embracing the bead and rim is provided a split ring or annular member 6 of channel or U-shape in cross-section, having a back or web portion 7 and substantially parallel flanges 8 extending therefrom. The ring is applied to the drum and head, and the free ends thereof are joined to secure the assembly together. My invention is particularly directed to a means for removably securing said ring ends on the drum or container.

In the form shown by Figs. 1 to 4, the ends of the split ring 6 are designed to abut, as at $a$, when said ring is secured in position on the container. A latch portion or member 9 spans the joint $a$ and has one end thereof welded or otherwise secured to one of the ring ends so as to form a continuation thereof. If desired, the portion 9 may be formed as an integral part of the said ring. Said portion or member 9 bears the same curvature as the ring 6, and is of channel or U-shape in cross-section, having a back or web portion 10 and extended substantially parallel flanges 11, the size of said member being sufficient to overlap and receive the ring ends therein. Said ring and latch member are preferably formed of a resilient metal which will assist the manipulation thereof in applying and removing the same to and from the container.

For the purpose of securing the ring against circumferential opening movement, the flanges 8 of the ring ends and flanges 11 of the latch portion are provided with cooperating interlocking means, comprising oppositely disposed lugs or projections 12 and 13, the lugs 12 being on the ring flanges 8 and projecting outwardly therefrom, and the lugs 13 of the latch portion projecting inwardly from the flanges 11 thereof.

The said projections terminate in radial or transverse abutting edges substantially in line with the planes of contact $b$—$b$ between the flanges 8 and 11 of the ring and latch members respectively, when assembled, said edges thereby meeting in interlocking engagement at c. (See Fig. 4.) Suitable through-slots or openings 14 are provided in said flanges 8 and 11 extending from the abutting edges of said lugs 12 and 13 in complimentary relation, whereby the lugs 12 are received in the openings in the flanges 11 and lugs 13 in the openings of flanges 8.

The lugs 12 and 13 are preferably rounded and tapered away from their abutting edges as shown in Fig. 1, to assist in the engagement and disengagement thereof, said rounded portions of engaging lugs bearing or riding upon each other to enable the meeting of their abutting edges, as will be readily understood. Also, the rounded formation will assist in the entrance and exit of the lugs in and from their receiving openings 14 by engaging the walls thereof.

Further means are provided to prevent separation of the ring 6, and more particularly, to resist the outward movement of the latch portion 9 from the ring end which it removably engages. Said means may be of various forms, but I prefer to provide struck-out lugs or projections 15 in the flanges 8 of the ring, having terminal edges 16 extending in a longitudinal direction with respect to said flanges, at an angle to the abutting edges of the lugs 12 and 13.

The flanges 11 of the latch portion 9 are formed with struck-out lug-receiving sockets or recesses 17, one wall of each socket or recess being transversely inclined inwardly and toward the edge of the flange 11, as at d. The terminal edges 16 of the lugs 15 are correspondingly inclined for contact with said walls.

In securing the ring 6 on a container or drum of the character stated, the ends thereof are urged together by any suitable means, and the latch member 9 pressed into operative engagement. The lugs 12 and 13 cause their flanges to deflect somewhat, due to the action hereinbefore described, until said lugs engage in interlocking relation. The lugs 15 are deflected inwardly a slight amount and when in register with their respective recesses 17, flex outwardly into interlocking engagement therewith. The resiliency of the flanges 11 will also assist the latter action.

The resiliency of the ring and latch member, as well as their interlocking parts will effect what may be termed a "snap-on" construction, whereby the parts are flexed upon engagement and react to quickly and securely interlock to provide a strong and rigid connection.

To disengage the ring, a suitable tool or member, as, for example, a nail or screw driver, may be inserted in an opening 18 of the back or web 10 of the latch member 9, into engagement with the back or web 7 of the ring 6. By exerting a prying action between the backs of said latch and ring with the tool, the lugs 12, 13, and 15 are readily disengaged. The rounded portions of the lugs 12 and 13 coact with the walls of openings 14 to separate the same by flexing their flanges apart. Also, the inclined walls d of the recesses 17 ride outwardly on and separate from the inclined edges 16 of their lugs 15. A projecting inclined portion 19 may be provided at the opening 18, to give additional bearing to the tool or member.

If desired, means may be provided for the application of a sealing device, as the lead disc 20 in Fig. 2, said means including a looped or apertured punched out projection 21 on the face of ring 6 and a slot or opening 22 in the latch member 9, said projection registering with and extending through the slot when the ring is closed.

Figs. 7 to 9 illustrate a modified form of my invention wherein the latch member 9a may be hinged at 23 to one free end of the ring 6a to span the juncture a of the ring ends, when said ring is closed. In such form, lugs 24 on the back of the ring, and opposed cooperating interlocking lugs 25 on the back of the latch member, may be substituted for the lugs 12 and 13 hereinbefore described. Suitable openings 26 are provided in the ring and latch member for clearance of said lugs 24 and 25 when the same are engaged.

When the latch member 9a is closed on the abutting ring ends, the transverse edges 27 of the lugs 24 and 25 engage to prevent circumferential opening movement of the ring. The lugs 15 are provided as before, and cooperate in interlocking relation with notches or recesses 17 on the latch member 9a, to resist opening pivotal movement of said latch member. The free end of said latch member may also be provided with a struck-up portion 28 for the insertion of a disengaging tool or member as before.

From the foregoing, it will be seen that I have provided by means of my invention, a split-ring construction for the purpose specified which lends itself to ready application to containers, and will be firmly secured thereon. Also, that a ring constructed in accordance with my invention may be frequently and repeatedly applied and removed without the danger of breakage or becoming inoperative.

It will be understood that various changes and modifications are contemplated within the scope of the following claims.

What I claim is:

1. In a split ring of the character described having overlapping ends, one of said ends having a latch portion and the other end having interlocking means co-operating with said latch portion to resist circumferential opening movement of said ring, the outermost portion of the overlapping ring end having means co-operating with the other end portion resisting outward opening movement of the ring when said ring is closed.

2. In a split ring of the character described having overlapping ends, one of said ends having a latch portion and the other end having interlocking means co-operating with said latch portion to resist circumferential opening movement of said ring, said end portions having transverse locking means spaced from said first interlocking means for resisting outward opening movement of the outermost portion of the overlapping ring end when said ring is closed.

3. In a split ring of the character described having overlapping ends, one of said ends having a latch portion and the other end having resilient lug means co-operating with said latch portion to resist circumferential opening movement of said ring, said lug means having a transverse edge at the zone of its engagement with said latch means, the outermost portion of the overlapping ring end having means co-operating with the other end portion resisting outward opening movement of the ring when said ring is closed.

4. In a split ring of the character described having overlapping ends, one of said ends having a latch portion and the other end having resilient lugs and openings extending from the same toward the remote ends of the ring co-operating to resist circumferential movement of said ring, the outermost portion of the overlapping ring end having means co-operating with the other end portion resisting outward opening movement of the ring when said ring is closed.

5. In a split ring of the character described having overlapping ends provided with substantially contacting flanges, one of said ends having a latch portion, the flanges of the latch portion and of the other end having resilient lugs co-operating to resist circumferential opening movement of said ring, the said contacting flanges also having transversely interlocking means spaced from said lugs for resisting outward opening movement of the outermost portion of the overlapping ring end when said ring is closed.

6. In a split ring of the character described having overlapping ends provided with substantially contacting flanges, one of said ends having a latch portion, the flanges of the other end and of said latch portion having interlocking lugs co-operating to resist circumferential opening movement of said ring, the ring having an opening extending from each lug between the same and remote terminal of the ring to enable the lugs to interlock, the outermost portion of the overlapping ring having means co-operating with the other end portion resisting outward opening movement of the ring end when said ring is closed.

7. A split ring according to claim 6 wherein said ring including the latch portion is U-shaped in cross section, and the end edges of the ring proper terminate in circumferential alinement at a location intermediate the ends of the latch portion.

8. Clamping means for a barrel head or the like consisting of a split ring of the character described having overlapping, telescoped ends, each of said ends having a resilient lug and an opening extending from the free end of each lug toward the remote end of the ring, the free end of the lug of the innermost end portion being disposed outwardly across the line of circumferential engagement of said ends, the free end of the other lug being disposed inwardly across the said line, whereby during the fastening of the ends said lugs move past and automatically displace each other and then snap into position with their free end edges abutting and resisting circumferential opening movement of the ring.

9. In a split ring of the character described having overlapping ends, one of said ends having a latch portion and the other end having interlocking means co-operating with said latch portion to resist circumferential opening movement of said ring, and co-operating interlocking means between the end portions resisting outward opening movement of the outermost portion of the overlapping ring end when said ring is closed, said latch portion being pivoted to the ring for outward opening movement, and the end edges of the ring proper being adapted to abut at a location intermediate the ends of the latch portion.

ALBERT E. JESSER.